US009026596B2

(12) United States Patent
Perez et al.

(10) Patent No.: US 9,026,596 B2
(45) Date of Patent: May 5, 2015

(54) SHARING OF EVENT MEDIA STREAMS

(75) Inventors: Kathryn Stone Perez, Kirkland, WA (US); Alex Kipman, Redmond, WA (US); Andrew Fuller, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 781 days.

(21) Appl. No.: 13/162,528

(22) Filed: Jun. 16, 2011

(65) Prior Publication Data
US 2012/0320013 A1 Dec. 20, 2012

(51) Int. Cl.
| | |
|---|---|
| G06F 15/16 | (2006.01) |
| G02B 27/01 | (2006.01) |
| H04N 5/91 | (2006.01) |
| H04N 9/82 | (2006.01) |
| H04N 21/2743 | (2011.01) |
| H04N 21/41 | (2011.01) |

(Continued)

(52) U.S. Cl.
CPC .............. *G02B 27/017* (2013.01); *H04N 5/765* (2013.01); *H04N 5/91* (2013.01); *H04N 9/8205* (2013.01); *H04N 9/8227* (2013.01); *H04N 21/2743* (2013.01); *H04N 21/4122* (2013.01); *H04N 21/41407* (2013.01); *H04N 21/4223* (2013.01); *H04N 21/435* (2013.01); *H04N 21/4756* (2013.01); *H04N 21/4788* (2013.01); *H04N 21/632* (2013.01); *H04N 21/6377* (2013.01); *G02B 2027/0138* (2013.01); *G02B 2027/014* (2013.01)

(58) Field of Classification Search
USPC .............. 709/205, 217; 348/39; 345/207
See application file for complete search history.

(56) References Cited

U.S. PATENT DOCUMENTS

| | | |
|---|---|---|
| 6,553,180 B1 | 4/2003 | Kikuchi et al. |
| 7,657,083 B2 | 2/2010 | Parr et al. |

(Continued)

FOREIGN PATENT DOCUMENTS

| | | | |
|---|---|---|---|
| GB | 2421830 A | * | 7/2006 |
| WO | WO 02065245 A2 | * | 8/2002 |
| WO | WO 2006073641 A2 | * | 7/2006 |

OTHER PUBLICATIONS

Inamoto, et al., "Virtual Viewpoint Replay for a Soccer Match by View Interpolation From Multiple Cameras", Retrieved at <<http:ieeexplore.ieee.org/stamp/stamp.jsp?tp=&arnumber=4303029>>, IEEE Transactions on Multimedia, vol. 9 No. 6, Oct. 2007, pp. 1155-1166.

(Continued)

*Primary Examiner* — Kostas Katsikis
(74) *Attorney, Agent, or Firm* — Micah Goldsmith; Judy Yee; Micky Minhas

(57) ABSTRACT

Embodiments are disclosed that relate to sharing media streams capturing different perspectives of an event. For example, one embodiment provides, on a computing device, a method including storing an event definition for an event, receiving from each capture device of a plurality of capture devices a request to share a media stream provided by the capture device, receiving a media stream from each capture device of the plurality of capture devices, and associating a subset of media streams from the plurality of capture devices with the event based upon the event definition. The method further includes receiving a request for transmission of a selected media stream associated with the event, and sending the selected media stream associated with the event to the requesting capture device.

15 Claims, 5 Drawing Sheets

(51) Int. Cl.
*H04N 21/414* (2011.01)
*H04N 21/4223* (2011.01)
*H04N 21/435* (2011.01)
*H04N 21/475* (2011.01)
*H04N 21/4788* (2011.01)
*H04N 21/63* (2011.01)
*H04N 21/6377* (2011.01)
*H04N 5/765* (2006.01)

(56) References Cited

U.S. PATENT DOCUMENTS

| | | |
|---|---|---|
| 7,823,056 B1 | 10/2010 | Davey et al. |
| 2003/0113096 A1 | 6/2003 | Taira et al. |
| 2004/0015992 A1* | 1/2004 | Hasegawa et al. ............ 725/86 |
| 2004/0143630 A1* | 7/2004 | Kaufmann et al. ......... 709/205 |
| 2005/0076392 A1* | 4/2005 | Jung et al. .................. 725/135 |
| 2006/0028488 A1* | 2/2006 | Gabay et al. ............... 345/626 |
| 2007/0179854 A1 | 8/2007 | Ziv et al. |
| 2008/0137756 A1* | 6/2008 | Scherlis et al. ........ 375/240.28 |
| 2009/0047004 A1* | 2/2009 | Johnson et al. ............ 386/126 |
| 2009/0113389 A1* | 4/2009 | Ergo et al. .................. 717/120 |
| 2009/0148124 A1* | 6/2009 | Athsani et al. ............... 386/46 |
| 2010/0080150 A1* | 4/2010 | Steiner et al. ............... 370/260 |
| 2010/0103173 A1* | 4/2010 | Lee et al. ................... 345/427 |
| 2010/0125511 A1* | 5/2010 | Jouret et al. ................. 705/27 |
| 2010/0208082 A1 | 8/2010 | Buchner et al. |
| 2010/0259593 A1* | 10/2010 | Beers et al. .............. 348/14.09 |
| 2012/0131139 A1* | 5/2012 | Siripurapu et al. .......... 709/217 |
| 2012/0236031 A1 | 9/2012 | Haddick et al. |

OTHER PUBLICATIONS

Inamoto, et al., "Intermediate View Generation of Soccer Scene from Multiple Videos", Retrieved at <<http://citeseerx.ist.psu.edu/viewdoc/download?doi=10.1.1.6.7135&rep=rep1&type=pdf>>, 16th International Conference on Pattern Recognition, vol. 2, 2002, pp. 4.

* cited by examiner

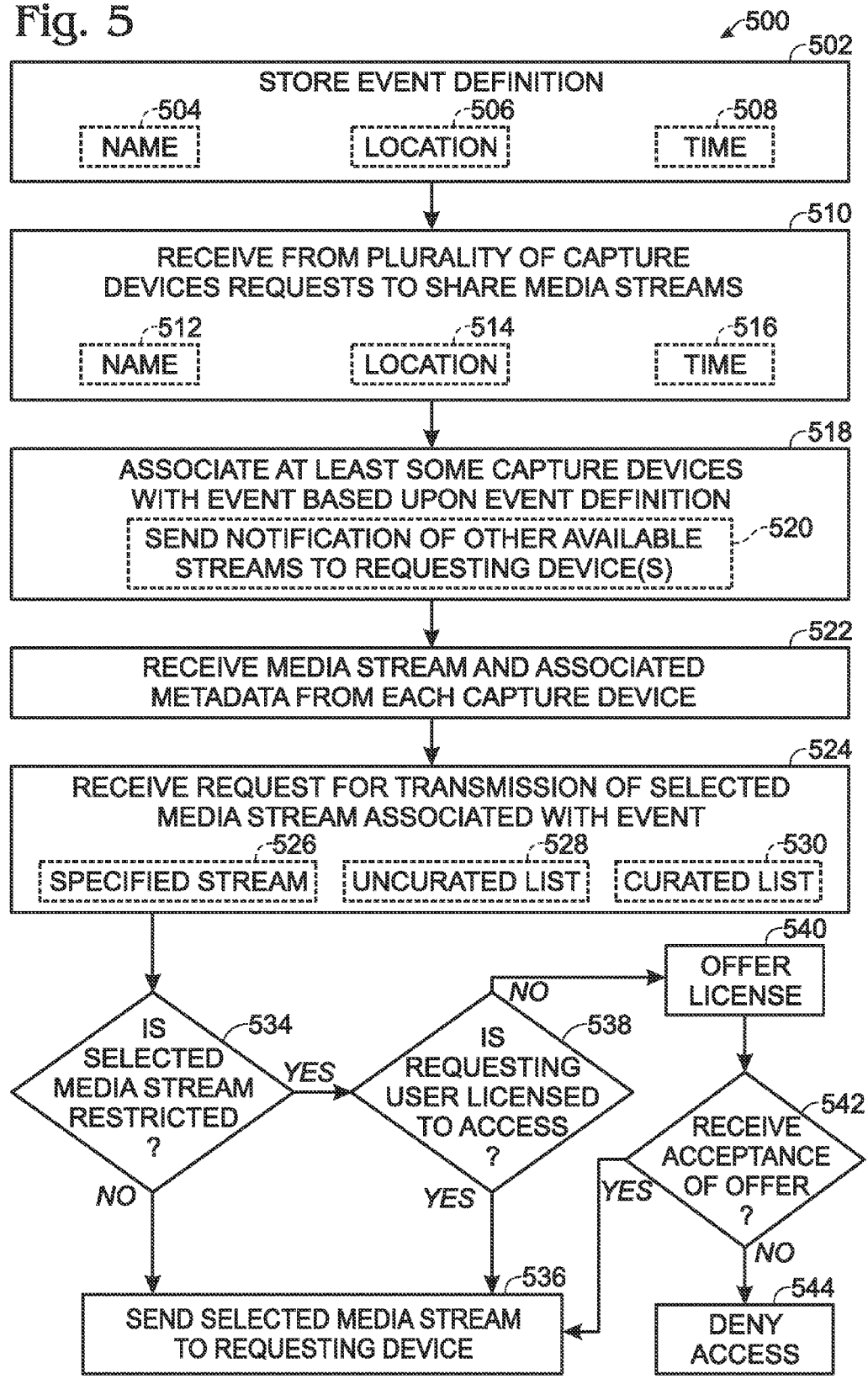

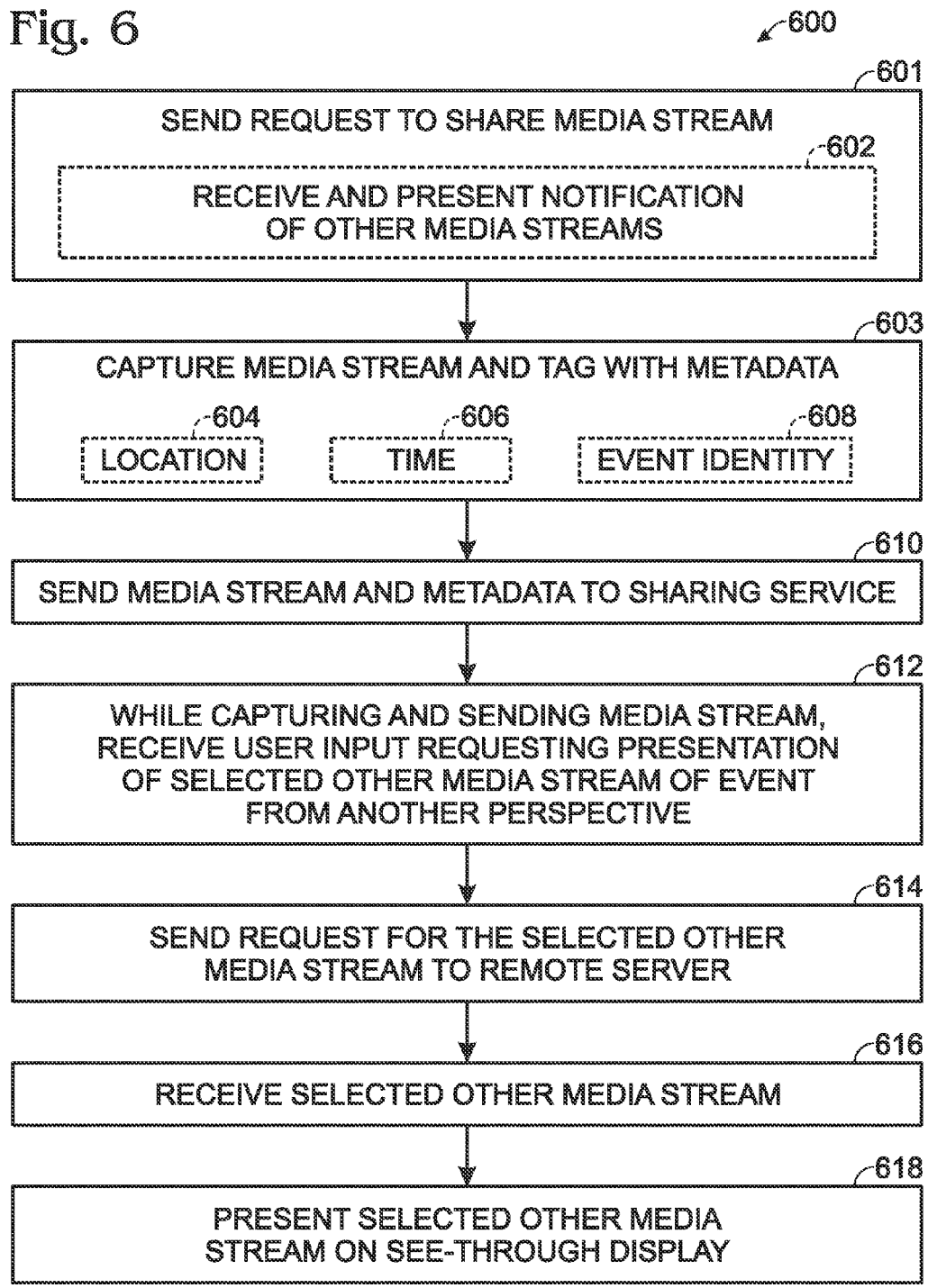

SHARING OF EVENT MEDIA STREAMS

BACKGROUND

Events, such as concerts, sporting events, and the like, are often enjoyed via live or pre-recorded media broadcasts or streams. Television broadcasts generally involve the capture of the event via one or more cameras located at different perspectives. This allows a producer to select which feeds to present to an audience. Similar models may be followed for event-related media streams provided over a computer network, in that a production company may editorially control the audio and/or video capture and feed selection that is provided to end users.

SUMMARY

Various embodiments are disclosed herein that are related to sharing media streams capturing different perspectives of an event. For example, one embodiment provides, on a computing device, a method comprising storing an event definition for an event, receiving from each capture device of a plurality of capture devices a request to share a media stream provided by the capture device, receiving a media stream from each capture device of the plurality of capture devices, and associating a subset of media streams from the plurality of capture devices with the event based upon the event definition. The method further comprises receiving a request for transmission of a selected media stream associated with the event, and sending the selected media stream associated with the event to the requesting capture device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 shows a flow diagram depicting an embodiment of a method of sharing media streams associated with an event.

FIG. 6 shows a flow diagram depicting an embodiment of a method of sharing media streams associated with an event.

DETAILED DESCRIPTION

In ordinary broadcast and streaming media models, a viewing experience may be limited to the camera positions selected by a producer for broadcast, and further limited by the producer's selection of a feed from a particular camera position to show at a particular time to the exclusion of other available feeds. Even where a user is provided multiple media feeds (audio and/or video) that the user may select between, the available perspectives are generally determined by the producer, and may be relatively limited in number.

Likewise, when viewing an event live, a person's perspective of the event may be dictated by where the person is sitting in the stadium. Thus, a spectator at a football game, for example, sitting far away from the action or at a particular angle might not be able to see a kick or goal. Likewise, at a concert, a viewer's particular seat may not allow a clear view of, for example, a band member that may be obscured by other band members, equipment such as amplifiers, etc.

Thus, embodiments are disclosed herein that relate to capturing and sharing media streams of an event from different perspectives so that the event may be enjoyed from a selection of perspectives, either in real time or at a later time. Any suitable event may be shared in such a manner. Example events may include, but are not limited to, planned events such as sporting games, concerts, lectures, celebrations (e.g. Times Square New Year's countdown), ceremonies, recitals, etc., as well as unplanned and/or spontaneous occurrences of viewing interest, such as a street performance, emergency incident (e.g. such that emergency personnel can view different perspectives of an unfolding situation), etc.

Capture devices for capturing, transmitting, receiving, and displaying media streams may be worn or otherwise carried by spectators observing an event from different perspectives. This may allow each spectator to capture and transmit a media stream of the event for sharing with others. Likewise, each spectator may choose to receive a media stream of the event captured by another spectator having a different perspective to enjoy the event from the different perspective. Depending upon a number of spectators at the event wearing or otherwise carrying capture devices, a potentially large number of perspectives of the event may be captured, thereby potentially providing users with a broad range of perspectives to enjoy.

Figure 1:
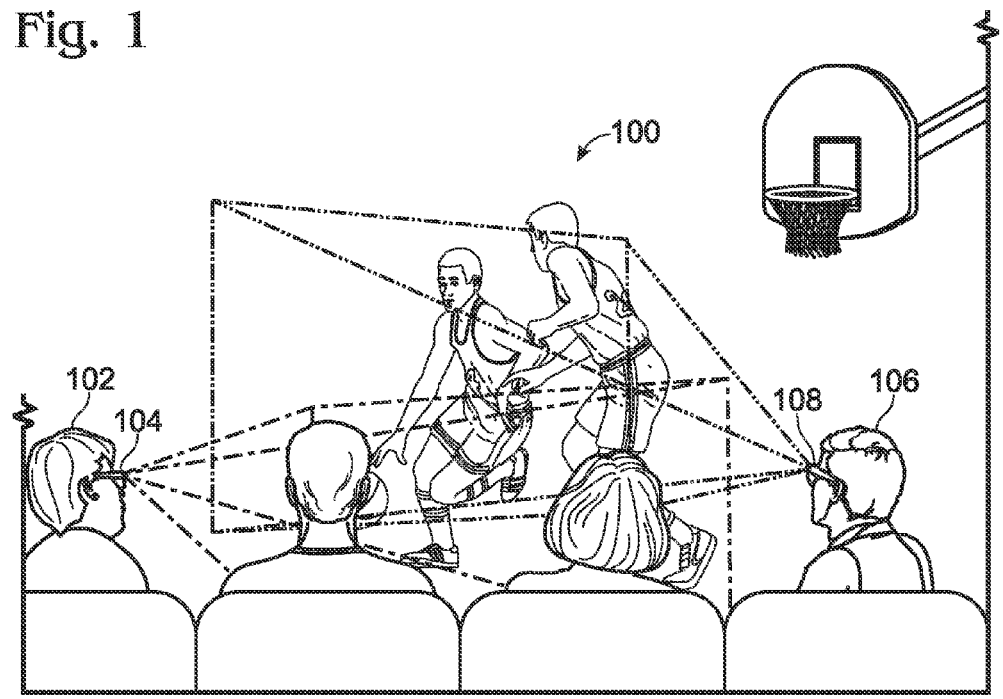
FIG. 1 illustrates an embodiment of a use environment for sharing media streams capturing different perspectives of an event.

FIG. 1 shows an embodiment of an event in the form of a basketball game being viewed by an audience 100. Audience 100 comprises a first user 102 wearing a first capture device 104, and a second user 106 wearing a second capture device 108. First user 102 and second user 106 are sitting apart from one other, and therefore are capturing different perspectives of the event, as indicated by the dashed line depictions of the field of view of each capture device. The captured media streams may be provided to a remote server via a network. Other capture devices may then receive the captured media streams from the remote server for playback. It will be understood that the audience may have any number of people wearing or otherwise carrying capture devices at any number of locations.

In the depicted embodiment, the first capture device 104 and the second capture device 108 are each shown in the form of glasses worn by each user. As described in more detail below, such capture devices may have any of a number of different sensors for capturing a media stream of the event, as well as a see-through display subsystem for displaying a different media stream of the event than that being recorded. In other embodiments, the capture devices may take any other suitable form, such as handheld devices.

Figure 2:
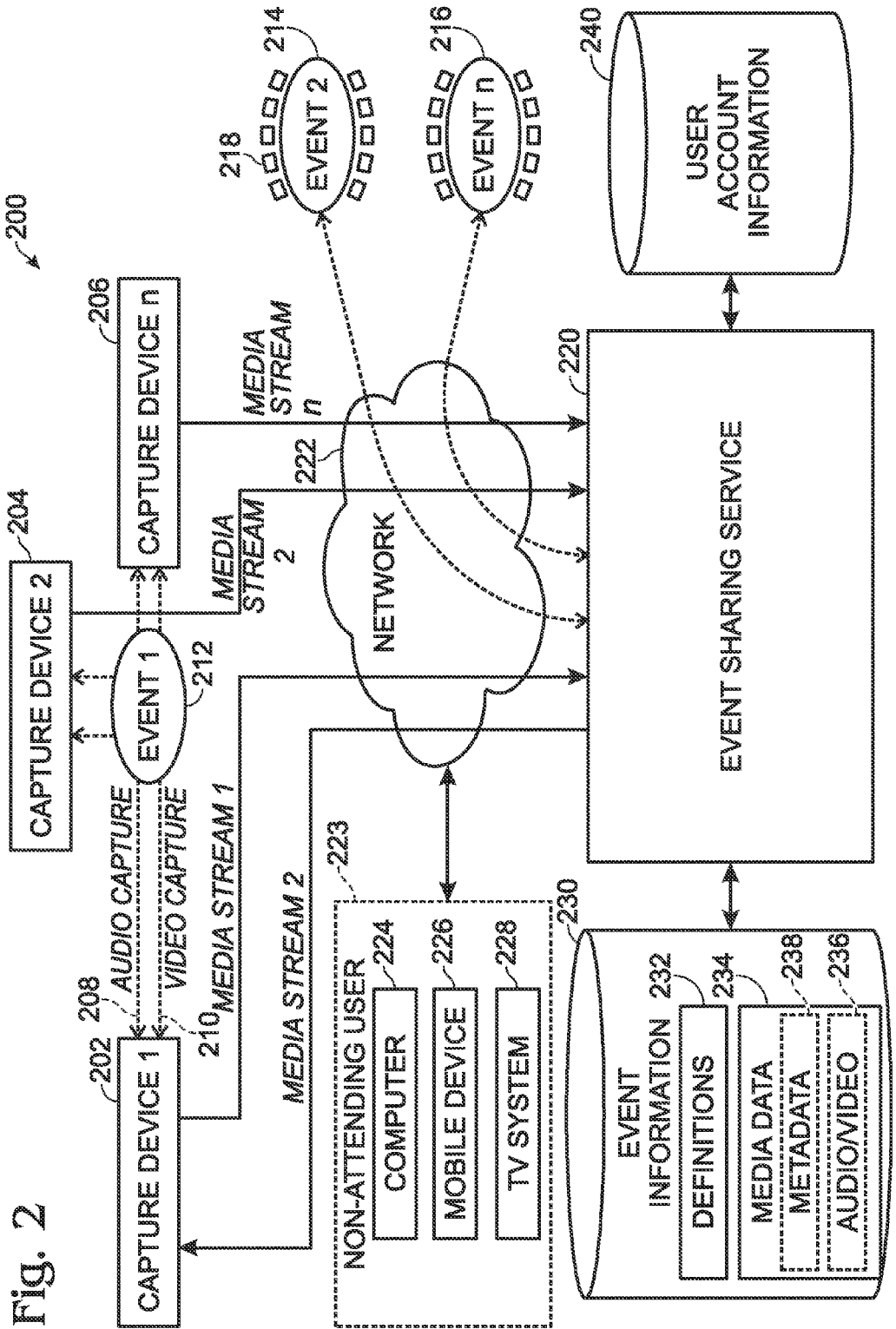
FIG. 2 shows a block diagram of an embodiment of a use environment for sharing media streams associated with a plurality of events.

FIG. 2 shows an embodiment of a use environment 200 for the capture and sharing of media streams of an event. Use environment 200 comprises an arbitrary number n of capture devices, illustrated as capture device 1 202, capture device 2 204, and capture device n 206. Each of these capture devices is depicted as capturing audio 208 and video 210 of a first event, illustrated as event 1 212. Second and third events, illustrated as event 2 214 and event 3 216, are shown, wherein each of these events is being captured by a set of other capture devices, an example of which is shown at 218. While each capture device associated with event 1 212 is shown as capturing both audio and video, it will be understood that some capture devices may capture only one of audio and video. Further, it will be understood that image data of other formats also may be captured, including but not limited to depth image data (e.g. via a structured light depth sensor, time-of-flight depth sensor, stereo camera, etc.), still image data such as JPEG data, or any other suitable type of data. Likewise, while three events are shown for the purpose of example, it will be understood that media streams may be received from any suitable number of devices capturing audio and/or video of any suitable number of events.

The audio and video captured by each capture device is encoded and sent to an event sharing service 220 in the form of a media stream, illustrated in FIG. 2 as media stream 1, media stream 2, and media stream n. Each media stream is provided to event sharing service 220 via a network 222. As explained in more detail below, the event sharing service 220 also may be configured to receive requests for media streams from capture devices, and to provide requested media streams to capture device for viewing by the wearers of the capture devices, even when the devices are currently capturing different perspectives of events. This is illustrated in FIG. 2 by capture device 1 202 receiving a media stream captured by capture device 2. Media streams to and from all capture devices associated with event 2 and event 3 are shown respectively via single dashed arrows for the purpose of clarity. It will be understood that the media stream may be sent in real time, or recorded by the capture device and then sent at a later time.

Likewise, streams may also be sent to a user 223 that is not attending the event. Such streams may be received and played on any suitable device, including but not limited to another capture device, a computer 224 (e.g. laptop, desktop, tablet, notebook, or any other suitable type of computer having any form factor), a mobile device 226 (e.g. a smart phone, media player, personal digital assistant, global positioning system device, or any other suitable mobile device), a television system 228 (which may include a game console, set-top box, and/or any other suitable hardware that enables the receipt of media streams over a network), and/or any other suitable playback device.

Event sharing service 220 is configured to receive, store, and send media streams associated with events. As described in more detail below, event sharing service 220 also may be configured to determine whether a stream from a capture device is to be associated with an event, and/or to recognize and assign a definition to an event where an event is not pre-defined by a producer or user. As such, the event sharing service 220 may comprise or otherwise communicate with an event information store 230 configured to store information related to events. For example, the event information store 230 may store event definitions 232 that define an event by one or more of a name or other identity, a location, a time (e.g. date and time of day), and/or any other suitable information.

Event definitions may be provided by a producer of a produced event, such as a concert or restricted-entry sporting event, or by an audience member. Further, such definitions may be automatically assigned by the event sharing service, for example, if a threshold number of received media streams originate within a threshold time frame from locations within a threshold distance. Such automatically defined events may or may not be user-confirmed. Where user confirmation is requested, a user may be asked to provide a name or other identity of the event upon confirming the existence of an event. Likewise, multiple media streams may be confirmed as capturing a same event by performing object detection to detect common objects captured in each stream.

Event information store 230 also may store media data 234 received from captured devices that have been associated with a defined event. Such media data may include audio and/or video data 236 for streaming to requesting devices, and also metadata 238 related to audio and/or video data 236. Any suitable metadata 238 may be stored along with audio and/or video data 236. For example, metadata 238 for a selected stored media item may include an identity of an event that is captured by the media item, an identity of a user that captured the media item, a location at which the media item was captured, a perspective captured by the media item (e.g. by compass direction, seat/row information or other perspective-related information), a time at which the media item was captured, and/or any other suitable information. While the event sharing service 220 is shown in FIG. 2 as communicating directly with a local event information store 230, it will be understood that the event sharing service 220 may also communicate with a remote event information store via network 222.

Event sharing service 220 also may comprise or otherwise communicate with a user account information store 240. User account information store may comprise information regarding the identity of registered users as well as devices associated with those users. This may allow a user that requests to share or receive a media stream to be identified based upon the identity of the device used to send the request, and further may help to enable multiple device experiences (e.g. where an ancillary experience is provided on a mobile hand-held device while the user is capturing and/or viewing an event via a head-mounted capture device). It will be understood that any other suitable user information may be stored in user account information store 240.

The sharing of event media streams as described herein may offer advantages over traditional broadcast and streaming models. For example, the use of personal capture devices to generate media streams may facilitate the collection of a potentially large number of different viewing perspectives for real time or later consumption with little additional cost to a producer or host. In an environment where a substantial portion of an audience is wearing or otherwise carrying capture devices, a sufficient number of streams may be received to allow a three-dimensional representation of the event to be recreated, for example, by stitching together video images from a sufficient number of capture devices, by interpolating image data based upon received data, and/or in any other suitable manner. Then, a user requesting playback may be able to select to view the event from a continuum of perspectives in the three-dimensional representation. Thus, crowd-sourced media content may be used to create a compelling long-term piece of content that exists after the event. Likewise, similar methods may be used to mesh captured streams during live event so that users can view the event from a continuum of perspectives while the event is occurring.

In addition to media streams generated by users with capture devices, in some embodiments, a producer may set up capture devices at pre-determined locations, such as on a sports game sideline, in a press box, on a stage looking out over an audience or at a specific performer, or even on a player or performer. In such embodiments, a user that wants to view a different perspective may be able to receive media streams from audience members as well as from the producer-controlled capture devices.

In some embodiments, a user that is capturing video and/or audio content of an event may be able to tag portions of the captured media content that is of particular interest to other viewers. For example, if a user is observing a football game from a location near a goalpost, the user may be able to set a flag during media capture that alerts others to the higher interest status of the captured media at that time. Then, users who are seeking a better view of a game at that time may be able to locate the tagged stream via its tagged status to get a better view of game play near the goalpost.

A user may discover media streams for viewing other perspectives of an event in any suitable manner. For example, content may be curated such that a list of all available media streams for an event is processed to attempt to identify streams of particular interest and/or relevance.

Likewise, a user also may be able to discover uncurated content, for example, via social contacts, search engine, favorites list (e.g. based upon previous experience with or notoriety of particular persons recording an event), by browsing available feeds for an event, etc. Users may have incentive to become well-known for providing good quality media streams, for example, by capturing stable video from good seats, as a user may gain social status among other users and earn advertising revenue based upon increased views of the media streams captured.

Media streams associated with an event may be curated in any suitable manner to aid users with content discovery. For example, in some embodiments, content may be manually curated, such that a producer or other person selects streams of particular interest and/or good quality for providing to other users. Such curation may be full or partial, such that a user is respectively provided with a selected stream for viewing, or with a selected list of feeds from with the user may make a final selection.

Likewise, curation may be automated, or a mix of automated and manual. For example, event sharing service 220 may be configured to automatically find media streams of particular interest by locating an object or item of interest from the event in a group of media streams associated with an event (e.g. a location of a football) and then apply heuristics to determine which perspective to show. As a more specific example, such a heuristic may highlight those streams acquired from locations that are closest to the object or item of interest, or that otherwise have a best view of the event. For example, object recognition may be performed to determine whether the object of interest is actually within view, as in some cases a capture device that is located close to the object may not be viewing the object (e.g. a capture device is standing near a goal but facing the wrong direction).

As other examples, streams of particular interest may be sorted based upon a flag status of content as flagged by a person recording the content during a period of particular interest (e.g. when game play is spatially close to the person recording), by current popularity (e.g. trending data), or in any other suitable manner. It will be understood that these examples of methods of curating content to facilitate discovery are presented for the purpose of example, and are not intended to be limiting in any manner.

Many events restrict access to the general public. Therefore, producers of such events likewise may wish to restrict access to media streams originated from the event by spectators. As such, event sharing service 220 may be configured to store and enforce access restrictions based upon event definitions. For example, a concert producer may, before occurrence of the concert, register the concert with the event sharing service 220 as an access-restricted event. The definition may define the event by identity (e.g. name), location, time, and/or with any other suitable information. The location information may specify geographical boundaries of the event (e.g. for an outdoor concert), or by the name of a venue with known, pre-configured geographical boundaries. Then, if a media stream is received from a location within the geographical boundaries and time window of a registered event (e.g. as determined from metadata sent with the stream), access to the media stream by other users may be restricted. In some cases, such restrictions may be applied to only part of an event. For example, at an awards ceremony, media streams provided from a media area outside of a theater (e.g. a red carpet area) may be unrestricted, while media streams provided from inside of the theater may be restricted. Such distinctions may be determined via GPS data received from the capture device and/or via other data, such as image data, audio data, and any other suitable data. As a further example, for a concert, streams capturing an opening act may be unrestricted, while streams capturing a headlining act may be restricted.

Users may be able to obtain licenses such restricted streams by paying an access fee. Such access fees may be applied to any class of user. For example, users who purchased tickets and attend an event may be able to view streams of other perspectives of the event for no additional cost, while those outside of the event may have to pay some fee to view streams originated from within the event. Alternatively, all users may have to pay a fee to view other perspectives. Any suitable set of content may be accessible upon payment of such a fee. For example, all streams currently being shared from within the event may be accessible, or only a sub-group of streams that is curated, for example, by a producer.

Such access fees may have any suitable structure. For example, a producer may allow access to any stream originated from within a restricted access event upon payment of a single access fee, or may charge a separate fee for each stream viewed. Further, such access fees may have a structure similar to ticket fees, wherein a user pays more to view a stream or streams originated from a location closer to the players, band, or other item of interest in the event than to view streams originated from less desirable locations. Likewise, users attending an event may be able to view streams from equally desirable or less desirable locations than the user's location for free, but be required to pay to view streams from better perspectives. It will be understood that these examples of access fees are presented for the purpose of example, and are not intended to be limiting in any manner.

As mentioned above, in some embodiments, a capture device may comprise a pair of glasses with a see-through head-mounted display system. In this manner, a user may be able to view a streamed event perspective on the glasses without looking away from the event. This may allow the user to capture the event with video and/or audio sensors on the glasses while viewing both a live perspective and a different streamed perspective of the event.

Figure 3:
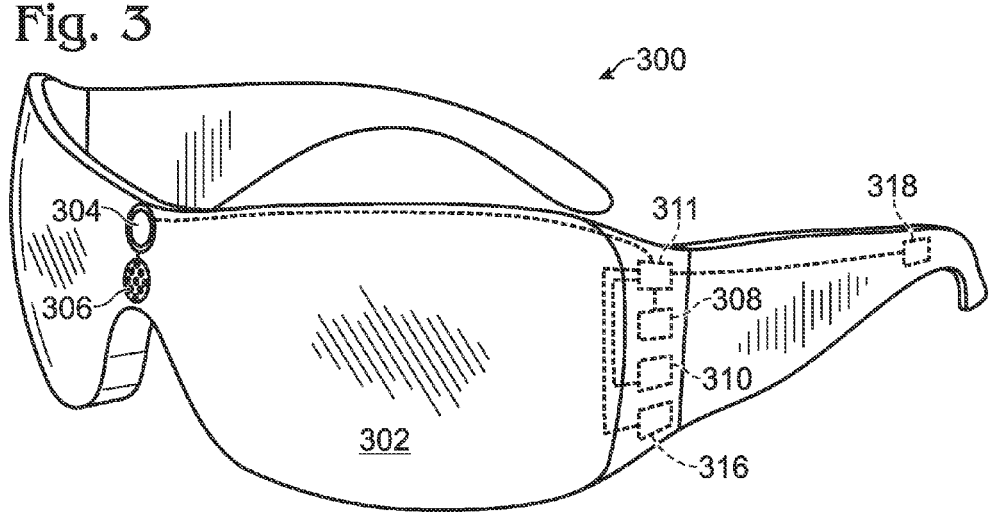
FIG. 3 shows an embodiment of a capture device.
Figure 4:
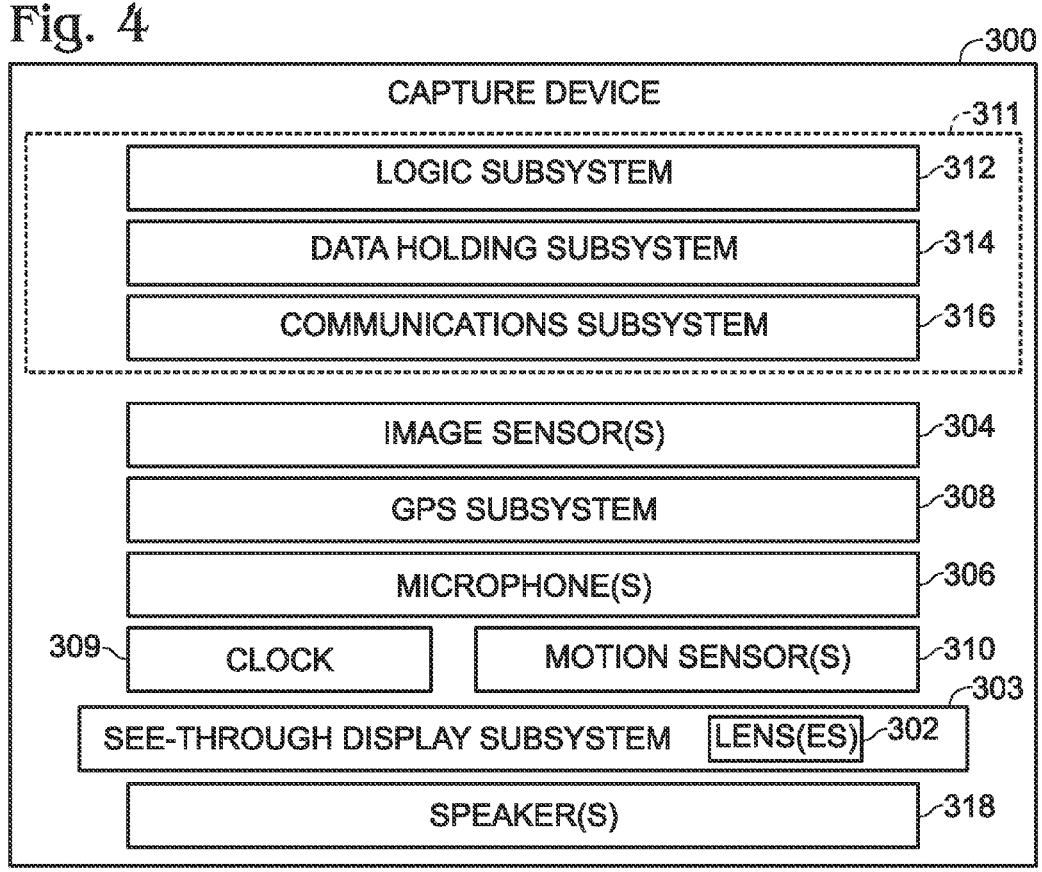
FIG. 4 shows a block diagram of the embodiment of FIG. 3.

FIG. 3 shows an embodiment of such a capture device 300, and FIG. 4 shows a block diagram of capture device 300. Capture device 300 comprises one or more lenses 302 that form a part of a see-through display subsystem 303, such that images may be projected onto the lenses 302, or produced by image-producing elements (e.g. see-through OLED displays) located within lenses 302. Capture device 300 further comprises one or more image sensors 304 configured to capture video images of a scene being viewed by a user, and one or more microphones 306 configured to capture sounds originating, for example, from within the scene. While the depicted capture device 300 is shown as comprising an image sensor and microphone directed toward a scene being captured, it will be understood that capture device 300 may include one or more additional image sensors configured to track the eyes of a user wearing capture device 300, and/or a directional microphone configured to detect sounds originating from the user of capture device 300. Such image and audio sensors may be employed as user input devices that allow a user to interact with capture device 300 via eye motions and/or voice command.

Capture device 300 may further comprise additional sensors. For example, capture device 300 may comprise a global positioning (GPS) subsystem 308 including a GPS receiver. GPS subsystem 308 may allow a location of capture device 300 to be determined, and thereby allow a captured media stream (audio and/or video) to be tagged with location metadata. Likewise, the capture device 300 may comprise a clock 309 or otherwise be configured to receive a remotely generated time signal, to allow the captured media stream to be tagged with time metadata. In this manner, it can be determined by an event sharing server whether the media stream is generated within a sufficiently close time and location to other received media streams to potentially capture a same event as the other received media streams. Further, the use of a clock also may allow streams to be time-synched to allow various scenarios, such as providing independently captured stereo streams to a user for three dimensional viewing of the event.

Capture device 300 likewise may include one or more motion sensors 310 to detect movements of a user's head when the user is wearing the capture device 300. This may enable the adjustment of video captured by the capture device 300 for small changes in direction and orientation of the capture device to stabilize the image. Likewise, motion sensors 310 also may be employed as user input devices, such that a user may interact with capture device 300 via gestures of the neck and head, or even of the body. It will be understood that sensors illustrated in FIGS. 3 and 4 are shown for the purpose of example and are not intended to be limiting in any manner, as any other suitable sensors and/or combination of sensors may be utilized.

Capture device 300 further comprises a controller 311 having a logic subsystem 312 and a data-holding subsystem 314 in communication with the sensors and the see-through display subsystem. Data-holding subsystem 314 comprises instructions stored thereon that are executable by logic subsystem 312, for example, to receive and interpret inputs from the sensors, to send a captured media stream to an event sharing server over a network via a communications subsystem 316, to receive other media streams from the event sharing server over the network, and to present such media streams to the user via the see-through display subsystem 303 and/or one or more speakers 318. It will be understood that data-holding subsystem 314 also may store captured media streams for later transfer to an event sharing server or other receiving device.

A streamed perspective of the event received by a capture device may be presented in any suitable manner on the capture device. For example, referring to capture device 300, a received media stream may be presented such that the displayed video image fills substantially an entire viewable area of lenses 302, such that the video image is either overlaid on the view of the physical world, or takes over the view of the physical world. Likewise, the video image may be presented in only a portion of the viewable area of lenses 302, for example, in a window displayed on a portion of lenses 302.

As mentioned above, the media streams captured and transmitted by capture device 300 are tagged with metadata such as the location at which the media stream was captured, the time it was captured, and potentially the identity of an event if designated by a user (for example, via voice command). Further, other metadata may be included as well. For example, metadata regarding intra-video or intra-audio objects may be included as keywords, or as metadata linked to one or more specific audio or video frames. As a more specific example, a user standing close to a goal in a football game may provide keywords such as "goal line", by voice command or in any other suitable manner. Then, other users may be able to locate that stream via keyword searching, for example, by a voice command such as "change to goal line camera." The change request may be transmitted to the event sharing server, which may perform a search and return streams from one or more perspectives with keywords that match the search terms. Likewise, intra-video or intra-audio objects may be automatically identified, and then tagged with metadata based upon the automated identification. It will be understood that some metadata tagging also may be performed by the remote sharing service after receipt of the media stream.

FIG. 5 shows a flow diagram depicting an embodiment of a method 500 of sharing media streams showing different perspectives of an event. Method 500 comprises, at 502, storing an event definition to which media streams may be compared to determine whether the streams are associated with the event. The definition may be received from an event promoter, organizer, spectator, etc., or may be automatically generated. Automatic generation of an event definition may occur, for example, when a threshold number of media streams originated from similar locations at similar times are received. Further, in some embodiments, the content of such proximate media streams may be analyzed for similar image and/or audio content, and an event definition generated only if similar content is found in the streams.

Where an event definition is automatically generated, a confirmation message may be sent to one or more of users providing the media streams requesting confirmation that the user is capturing an event, and also requesting information related to the event, such as an event name and/or description. The event definition may include any suitable information, including but not limited to an event name or other identity 504, an event location 506, and an event time 508. Where the event definition includes location information, the location information may be provided in the form of a name of an event venue or a mapping of a geographic boundary of the venue (e.g. as GPS coordinates). It will be understood that any suitable number of event definitions may be stored based upon a number of events for which media streams are received.

Method 500 further comprises, at 510, receiving from a plurality of capture devices requests to share media streams. For example, a user observing an event may elect to share a stream of the event, and turn on a sharing function of a capture device. Upon receiving the user input turning on the sharing function, the capture device may send the request to share its stream in the form of a request to initiate transmission of the stream. It will be understood that any suitable communication and processes may be used to establish a connection with a capture device. It will likewise be understood that any suitable information may be sent with the request, including but not limited to an identification of the capture device, identification of a user currently using the capture device, and/or information that allows the device to be associated with an event via the event definition. Such information may include, but is not limited to, a name 512 of an event or other event identity information, a current location 514 of the capture device, and/or a current time 516.

Continuing, method 500 next comprises, at 518, associating at least some of the capture devices from which requests to share were received with the event based upon the event definition. Thus, media streams and metadata received, at 522, from those devices will be associated with the event, and thus may be discoverable by another user seeking to view media streams of various perspectives of the event. Likewise, streams not associated with that particular event may be associated with other events based upon other event definitions.

Further, as indicated at 520, in some embodiments, upon receiving a request to share a media stream and associating the media stream with an event, a notification may be sent to the requesting capture device regarding whether other streams associated with the event are available for viewing. Such notifications may be sent to all capture devices associated with the event, or only a subset of capture devices, such as capture devices that have opted to receive such notifications.

Method 500 next comprises, at 524, receiving a request for transmission of a selected media stream associated with the event. Such a request may be received from another capture device, either during or after the event, or from any other suitable playback device, such as a computer, a mobile device, a television system, etc. The request may be for a specified stream 526, such as a stream captured by a contact, a social network member, a well-known person, etc. Likewise, the request may be received from an uncurated list 528 or a curated list 530 sent to the user prior to receiving the request for transmission of the selected media stream, as described above.

Upon receiving the request for the selected media stream, it may be determined, at 534, whether the media stream is access-restricted. If the media stream is not restricted, then the selected media stream is sent to the requesting device at 536. On the other hand, if the media stream is access-restricted, then it may be determined at 538 whether the requesting user is licensed to access the media stream, as described above. If the user is licensed to access the selected media stream, the selected media stream is sent to the requesting device at 536. On the other hand, if the user is not licensed to access the selected media stream, then method 500 comprises, at 540, applying an access restriction. This may comprise, for example, offering the user a license to access the restricted content for a fee. If an acceptance of the offer is received, as indicated at 542, the selected media stream is provided at 536. Otherwise, access may be denied, as indicated at 544. It will be understood that the specific steps and order of steps of FIG. 5 are presented for the purpose of illustration and are not intended to be limiting in any manner.

In some instances, a media stream associated with an event may not actually capture the associated event. For example, where a media stream is associated with an event that is automatically defined by location and/or time proximity of a plurality of received streams, streams may be erroneously associated with such an event definition. Thus, a user may be provided with a feedback mechanism for designating mistakenly associated streams. Such designations may then be used to reduce a likelihood that the same stream is provided to another user seeking streams of the erroneously associated event.

FIG. 6 shows another embodiment of a method 600 of sharing media streams showing different perspectives of an event. Whereas method 500 may be performed by an event sharing service, method 600 may be performed by a capture device. Method 600 comprises, at 601, sending a request to an event sharing service to share a media stream. The request may be sent, for example, if a user of the capture device performs a user input requesting transmission of a media stream to the media sharing service. Upon sending the request, a connection may be established with the event sharing service for the transmission of a media stream capturing the event. Further, upon sending the request, the capture device may receive and present via a see-through display on the capture device a notification of availability of other media streams associated with the event, as indicated at 602.

After sending the sharing request and establishing a connection with the media sharing service, method 600 comprises, at 603, capturing a media stream and tagging the media stream with metadata. The metadata may comprise information that allows the stream to be associated with an event. For example, the metadata may include one or more of a current location 604 of the capture device, a current time 606, and an identity (e.g. name) of an event captured by the media stream, for example, as identified by voice command. It will be understood that these specific types of metadata are presented for the purpose of example, and that any other suitable metadata may be generated for the media stream. For example, as described above, a user may wish to tag a media stream with keywords that describe a characteristic of the media stream (e.g. "stream captured at goal line") to assist other users in locating the stream for playback.

After capturing the media stream and tagging the media stream with metadata, the media stream is sent to the sharing service at 610. Further, while capturing and sending the media stream, the capture device receives a user input requesting presentation of a selected other media stream showing the event being viewed from another perspective. Such other media streams may be discovered in any suitable manner. For example, the request may be for a specified media stream, such as a media stream sourced by a contact, a social network member, a famous or otherwise well-known person, etc. Likewise, the request may be a selection of a media stream listed in a curated or uncurated list sent to the user, a selection of a media stream listed in search results from a search engine, or a selection made from any other suitable list.

After receiving the request for the selected other media stream, a request is sent to the event sharing service for the selected other media stream at 614, and the selected other media stream is received at 616. In some embodiments, as described above, the selected other media stream is not received unless and until a user is licensed to receive it. Thus, if a user has not acquired a license to receive the selected other media stream, a user may be offered an opportunity to acquire a license prior to receiving the selected other media stream.

Upon receipt of the selected other media stream, the selected other media stream is presented on a see-through display, at 618, or on another suitable display on the capture device. As mentioned above, the selected other media stream may be presented on a see-through display in any suitable manner. For example, the selected other media stream may be presented as an overlay through which the physical world is visible. Further, presentation of the selected other media stream may occupy the full view of a user, or only a portion of the view, such as a window presented on the see-through display.

Thus, in this manner, a user may both provide a unique perspective of an event for others to enjoy in real time or at a later time. Likewise, the user may enjoy other perspectives of an event even as the user captures a media stream of one perspective. Further, through the use of a capture device comprising a see-through head mounted display, a user may simultaneously enjoy a physical view of one perspective and a virtual view of another perspective of a same event.

As mentioned above, in some embodiments, the above described methods and processes may be tied to a computing system including one or more computers. In particular, the methods and processes described herein may be implemented as a computer application, computer service, computer API, computer library, and/or other computer program product.

Figure 7:
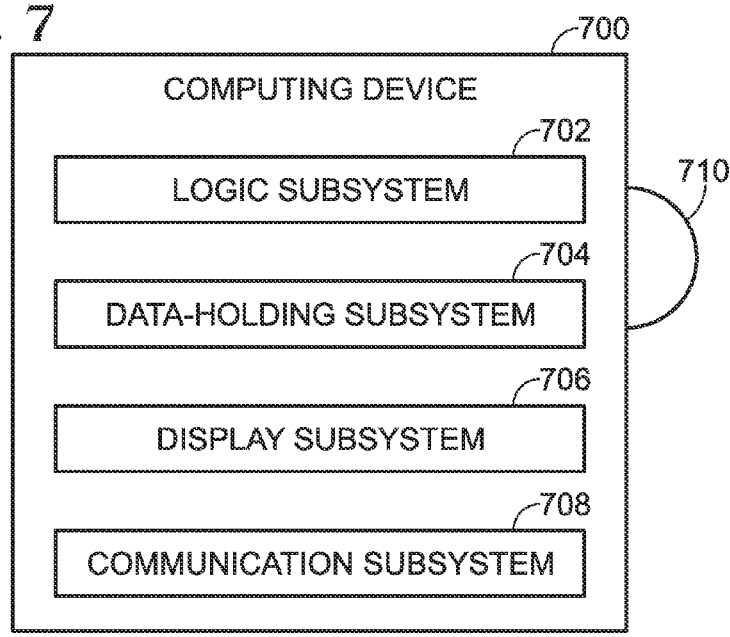
FIG. 7 shows an embodiment of a computing device.

FIG. 7 schematically shows a nonlimiting computing system 700 that may perform one or more of the above described methods and processes. Computing system 700 is shown in simplified form. It is to be understood that virtually any computer architecture may be used without departing from the scope of this disclosure. In different embodiments, computing system 700 may take the form of a mainframe computer, server computer, desktop computer, laptop computer, tablet computer, home entertainment computer, network computing device, mobile computing device such as a smart phone or media player, mobile communication device, gaming device, audio and/or video capture device, etc.

Computing system 700 includes a logic subsystem 702 and a data-holding subsystem 704. Computing system 700 may optionally include a display subsystem 706, communication subsystem 708, and/or other components not shown in FIG. 7. Computing system 700 may also optionally include user input devices such as keyboards, mice, game controllers, cameras, microphones, and/or touch screens, for example, as well as the other input devices such as those described above for capture device 300.

Logic subsystem 702 may include one or more physical devices configured to execute one or more instructions. For example, logic subsystem 702 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 702 may include one or more processors that are configured to execute software instructions. Additionally or alternatively, logic subsystem 702 may include one or more hardware or firmware logic machines configured to execute hardware or firmware instructions. Processors of logic subsystem 702 may be single core or multicore, and the programs executed thereon may be configured for parallel or distributed processing. Logic subsystem 702 may optionally include individual components that are distributed throughout two or more devices, which may be remotely located and/or configured for coordinated processing. One or more aspects of logic subsystem 702 may be virtualized and executed by remotely accessible networked computing devices configured in a cloud computing configuration.

Data-holding subsystem 704 may include one or more physical, non-transitory, devices configured to hold data and/or instructions executable by logic subsystem 702 to implement the herein described methods and processes. When such methods and processes are implemented, the state of data holding subsystem 704 may be transformed (e.g., to hold different data).

Data holding subsystem 704 may include removable media and/or built-in devices. Data holding subsystem 704 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data holding subsystem 704 may include devices with one or more of the following characteristics: volatile, nonvolatile, dynamic, static, read/write, read-only, random access, sequential access, location addressable, file addressable, and content addressable. In some embodiments, logic subsystem 702 and data holding subsystem 704 may be integrated into one or more common devices, such as an application specific integrated circuit or a system on a chip.

FIG. 7 also shows an aspect of the data-holding subsystem in the form of removable computer-readable storage media 710, which may be used to store and/or transfer data and/or instructions executable to implement the herein described methods and processes. Removable computer-readable storage media 710 may take the form of CDs, DVDs, HD-DVDs, Blu-Ray Discs, EEPROMs, and/or floppy disks, among others.

It is to be appreciated that data holding subsystem 704 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 700 that is implemented to perform one or more particular functions. In some cases, such a module, program, or engine may be instantiated via logic subsystem 702 executing instructions held by data holding subsystem 704. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, display subsystem 706 may be used to present a visual representation of data held by data holding subsystem 704. As the herein described methods and processes change the data held by the data-holding subsystem, and thus transform the state of the data-holding subsystem, the state of display subsystem 706 may likewise be transformed to visually represent changes in the underlying data. Display subsystem 706 may include one or more display devices utilizing virtually any type of technology. Such display devices may be combined with logic subsystem 702 and/or data holding subsystem 704 in a shared enclosure, or such display devices may be peripheral display devices.

When included, communication subsystem 708 may be configured to communicatively couple computing system 700 with one or more other computing devices. Communication subsystem 708 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 700 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device, a method of sharing media streams presenting different perspectives of an event, the method comprising:
   storing an event definition for the event;
   receiving from each capture device of a plurality of capture devices a request to share a media stream captured by the capture device, the media stream including sensor data produced by a sensor of the capture device and representing the capture device's perspective of an event;
   receiving a media stream from each capture device of the plurality of capture devices;
   associating at least some media streams from the plurality of capture devices with the event based upon the event definition;
   performing object recognition on each media stream associated with the event to determine whether the media stream includes an object of interest in the event;
   sending to the plurality of capture devices a list of available media streams associated with the event including a subset of media streams in which the object of interest in the event is recognized as being included in the media streams, wherein the subset comprises an automatically curated subset of media streams selected based upon a current popularity of each media stream;
   receiving from a requesting capture device a request for transmission of a selected media stream associated with the event for consumption by the requesting capture device; and
   sending the selected media stream associated with the event to the requesting capture device.

2. The method of claim 1, further comprising, after receiving from a selected capture device of the plurality of capture devices the request to share, sending to the selected capture device a notification of other available media streams associated with the event.

3. The method of claim 1, wherein the request for transmission of the selected media stream is received from a capture device that is providing a different media stream of the event than the selected media stream.

4. The method of claim 1, wherein sending the selected media stream associated with the event comprises sending the selected media stream during the event.

5. The method of claim 1, wherein the selected media stream is selected based upon an identity of a person that captured the selected media stream.

6. The method of claim 1, wherein the selected media stream includes the object of interest in the event.

7. The method of claim 1, wherein the list comprises a manually curated subset of media streams associated with the event.

8. The method of claim 1, wherein the list comprises an automatically curated subset of media streams associated with the event.

9. The method of claim 1, wherein the list includes an automatically curated subset of media streams selected based upon a proximity of a capture device that provided the media stream to the object of interest in the event.

10. The method of claim 1, wherein the list includes an automatically curated subset of media streams selected based upon a flag status of each media stream.

11. The method of claim 1, wherein the event is a first event, and further comprising storing an event definition for a second event and associating another subset of media streams of the plurality of media streams with the second event based upon the event definition for the second event.

12. The method of claim 1, further comprising, before sending the selected media stream, confirming that a user that requested the selected media stream is licensed to receive the selected media stream, and sending the selected media stream only if the user is licensed.

13. The method of claim 12, further comprising, before sending the selected media stream, determining whether to apply access restrictions to the selected media stream by determining whether the selected media stream is being captured or was captured within a time of the event and/or within a location of the event as specified in the event definition.

14. On a computing device, a method of providing a media stream of a restricted event, the method comprising:
   receiving a plurality of media streams of an event captured by a corresponding plurality of capture devices, each media stream including sensor data produced by a sensor of a corresponding capture device and representing the capture device's perspective of the event, the event having a designated time and a designated location;
   sending to at least some of the plurality of capture devices a list of available media streams associated with the event, the list including an automatically curated subset of media streams selected based upon a current popularity of each media stream;
   receiving from a requesting capture device a request for transmission of a selected media stream of the plurality of media streams;
   determining if the selected media stream is access-restricted;
   determining if the capture device is located at the designated location of the event at the designated time of the event;
   if the selected media stream is access-restricted and the requesting capture device is not located at the designated location of the event at the designated time of the event, then applying one or more access restrictions to the selected media stream;
   if the selected media stream is access-restricted and the requesting capture device is at the designated location of the event at the designated time of the event, then sending the selected media stream to the requesting capture device; and
   if the selected media stream is not access-restricted, then sending the selected media stream to the requesting capture device.

15. The method of claim 14, wherein applying access restrictions comprises sending to the requesting capture device an offer to license the selected media stream, receiving from the requesting capture device an acceptance of the offer to license, and in response to receiving the acceptance of the offer to license, sending the selected media stream to the requesting capture device.

* * * * *